United States Patent Office 2,766,511
Patented Oct. 16, 1956

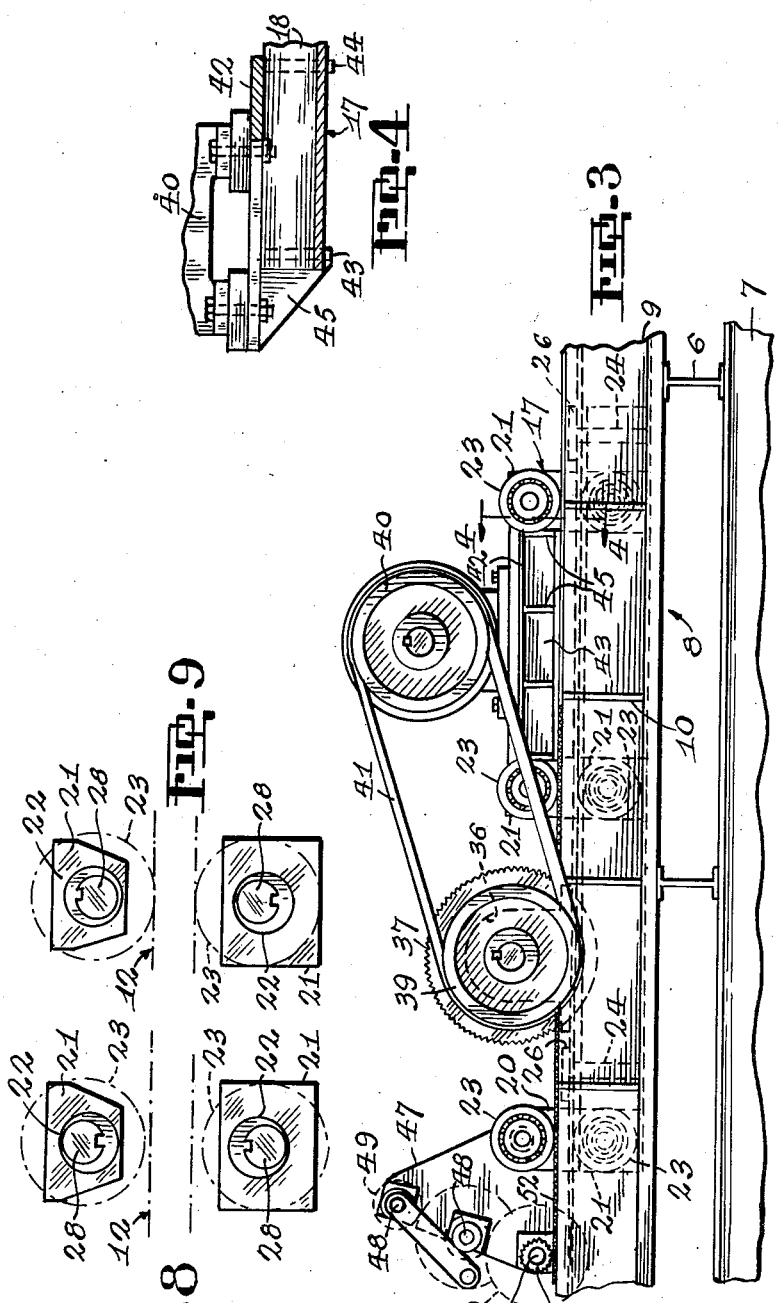

2,766,511

ALUMINUM SLITTING APPARATUS

Paul J. Lamoureux, Laval sur le Lac, Quebec, Canada, assignor to Montreal Architectural Iron Works, Limited, Montreal, Quebec, Canada Application July 27, 1953, Serial No. 370,576

4 Claims. (Cl. 29—70)

This invention relates to apparatus for cutting aluminum slabs and more particularly for slitting and trimming aluminum slabs of substantial thickness into relatively narrow elongated strips.

Heretofore it has been the practice to divide thick aluminum slabs into strips by shearing operations which require passing the slab between upper and lower shearing blades. One disadvantage of this procedure has been the requirement of tremendous pressure on the shearing blades to effect the shearing operation. This also increases the difficulty of feeding the slab against the blades as they are shearing. There has also been considerable trouble in maintaining a pressure on the blades which will ensure a clean cut through the slab. Thus jagged edges are left on the sheared strip and a further trimming operation is required. In cases where the slab has to be fed through the shearing blades additional equipment is required for aligning and carrying the slab and maintaining the slab in its aligned position throughout the shearing operation. The fact that the slabs as they are rolled have uneven side edges renders it more difficult to align and maintain the slab in alignment.

Attempts have also been made to successfully slit thick aluminum slabs by the use of band saws. These band saws are usually rigged up on a track and pushed or pulled through the slab to slit them. This method has proven unsatisfactory for the following reasons: (1) the speed of slitting with a band saw is very slow and any attempt to accelerate their forward movement results in jamming and/or breaking of the band saws; and (2) because of the difficulty in maintaining alignment of a band saw at the point of contact with the slab, the blade tends to produce ragged and irregular edges throughout the slit. This necessitates a further trimming operation along the edges of each strip, which, in turn, reduces the width of the strip beyond that which is desired unless allowance for waste has been calculated prior to the slitting operation. The present invention proposes to overcome substantially all of the above outlined and other difficulties heretofore encountered in forming aluminum strips.

The principal object of this invention is to provide a novel apparatus for slitting and trimming a broad slab of aluminum of substantial thickness into narrow elongated strips.

A particular feature of this invention consists in the provision of a stationary table structure having guide tracks on either side thereof for the mounting of a carriage over said table for slitting and trimming an aluminum slab secured to the table into narrow elongated strips.

The above and other objects and features characteristic of this invention will be understood more readily from the following detailed description taken in connection with the accompanying drawings, in which:

Fig. 3 is a side elevational view of the apparatus shown in Fig. 1.

Fig. 4 is a fragmentary detail taken along the lines 4—4 of Fig. 3.

Figs. 8 and 9 are views illustrating the manner in which the eccentrically mounted traction wheels are adjusted to bear against the track rail surfaces.

Figure 1:
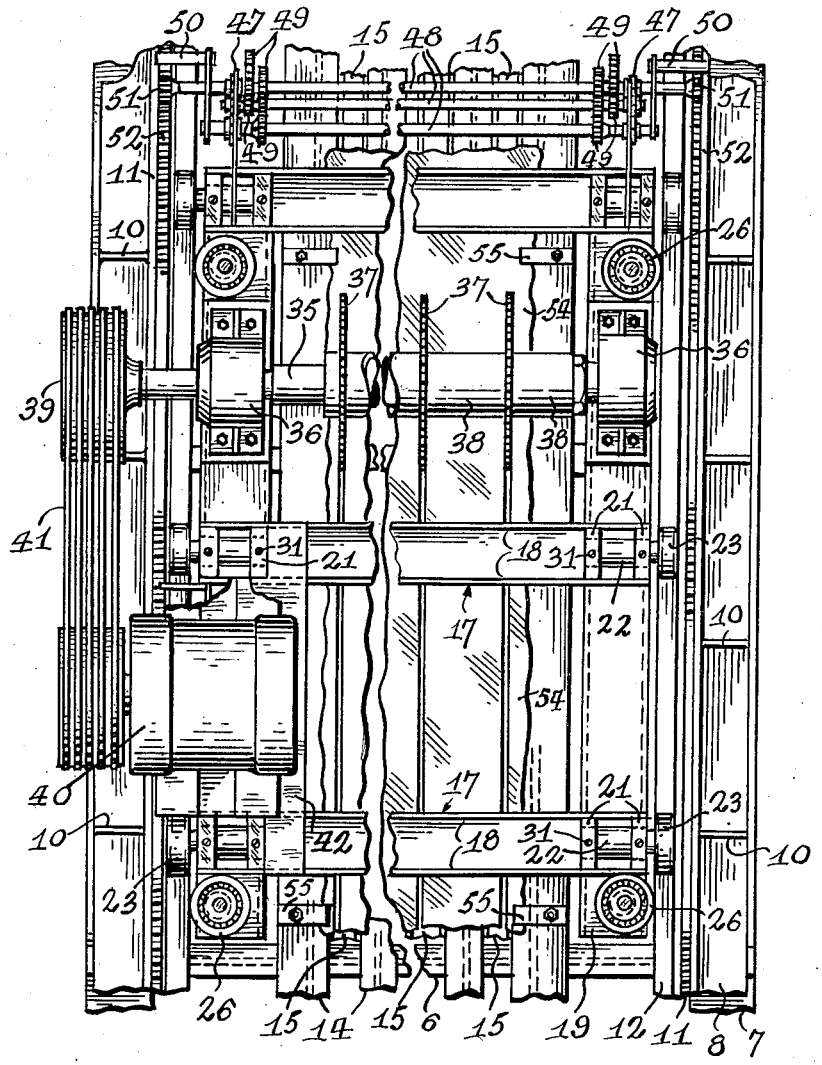
Fig. 1 is a top plan view, partly broken, of an apparatus embodying my invention.
Figure 2:
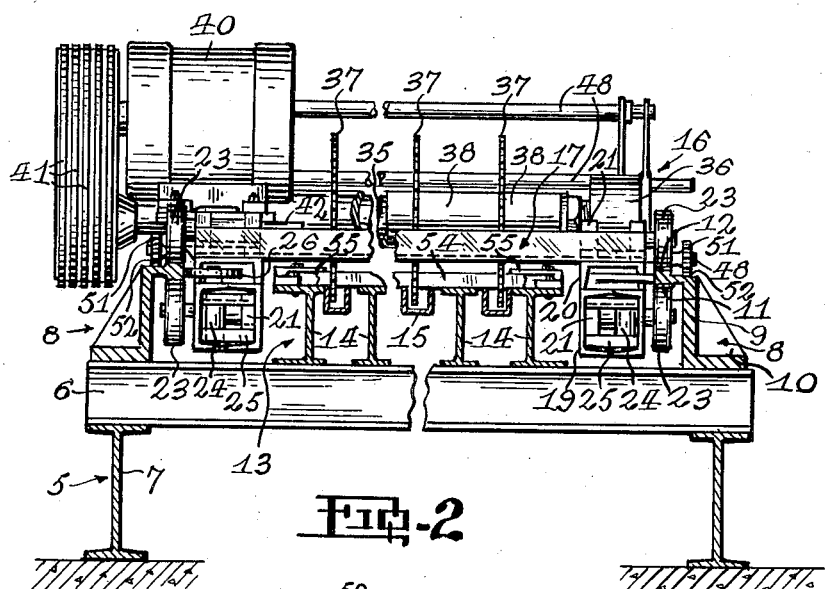
Fig. 2 is an end view of the apparatus shown in Fig. 1.
Figure 10:
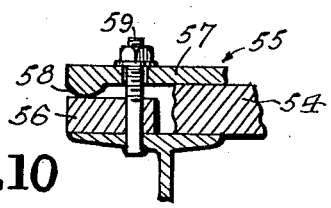
Fig. 10 is an enlarged fragmentary view in section of one of the slab clamping members shown in Figs. 1 and 2.
Figure 6:
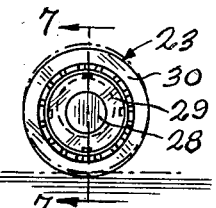
Fig. 6 is a detail of one of the traction wheel assemblies shown in Fig. 5.
Figure 5:
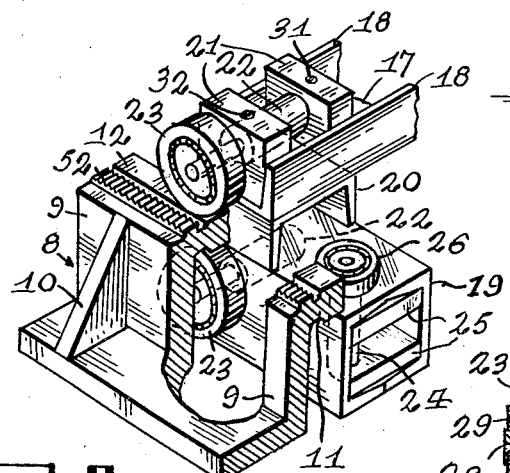
Fig. 5 is a fragmentary view in perspective showing details of the carriage roller guides.
Figure 7:
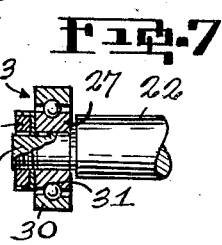
Fig. 7 is a sectional view taken along the lines 7—7 of Fig. 6.

As shown in these drawings my improved machine includes a base frame 5 comprising spaced transversely extending I-beams 6 supported on longitudinally-extending I-beams 7.

The base frame 5 supports thereon a pair of longitudinally extending track-carrying members 8 located adjacent the sides of the base frame. Each track-carrying member 8 comprises a substantially L-shaped section 9 provided with stiffening webs 10 and with an inwardly directed extension 11 terminating in a track member 12.

Base frame 5 also supports thereon a table structure generally indicated at 13. This table structure is positioned between and in spaced relation to the track-carrying members 8 and comprises a plurality of laterally spaced longitudinally extending I-beams 14. The table structure 13 also includes a plurality of open-top, longitudinally extending oil troughs 15. Each of these oil troughs is positioned between and welded to the inner edges of opposing upper flanges of two adjacent I-beams 14. One or both sides of the troughs may be provided with outwardly directed flanges, if necessary, which are butted against the I-beam flange and welded or otherwise secured thereto along the length of the flanges.

A saw carriage, generally indicated at 16 is supported on base frame 5 for longitudinal travelling movement. This saw carriage includes spaced transversely extending channel members 17 having their side flanges 18 directed upwardly. A pair of longitudinally extending beams 19, of hollow rectangular shape, are suspended from the ends of the channel members 17 by interimposed spacers 20 to which the channel members and the rectangular beams are welded or otherwise secured. The spacers 20 are here shown as consisting of relatively short inverted channel members arranged in pairs with the members of each pair welded or otherwise secured to one of the channel members and the underlying rectangular beams. The rectangular beams can be formed in any suitable manner and are here shown as being formed by welding together the side flanges of two channel shaped members.

A pair of bearings 21 are mounted in opposite ends of each channel member 17 and carry shafts 22 equipped with anti-friction traction wheels 23 arranged to travel along the upper surfaces of the previously mentioned track members 12. The side walls of rectangular beams 19 are bored to receive similar shafts 22 which are carried by bearings 21 mounted in beams 19 between the shaft receiving bores. These shafts are also equipped with anti-friction wheels 23 to travel along the lower surfaces of said track members 12.

The carriage is provided at its opposite ends with vertical shafts 24 extending through vertical openings in the rectangular beams 19 and carried by bearings 25 mounted within the beams 19. Shafts 24 are equipped at their upper ends with edge roll anti-friction wheels 26 arranged to engage the inner sides of said track members 12.

Each anti-friction wheel 23 and 26 is here shown as comprising an inner raceway 27 clamped in place on a trunnion 28 at one end of shafts 22 and 24 by a clamping nut 29 and an outer raceway 30 mounted on the inner raceway by interposing anti-friction elements 31. Each trunnion 28 is eccentric to its shaft to permit levelling of the carriage on the tracks by rotation of the upper shafts 22 in its bearings 21 until the axes of the upper trunnions are in a horizontal plane. A set screw 32 in upper bearings 21, then secures the shaft against further rotation. Lower shafts may be similarly adjusted to bring the wheels 23 to bear against the under surface of track 12 and are then secured against further rotation by set screws. The edge roll shafts 24 are also adjustable in the same manner to take up side play between edge roll wheels 26 and the adjacent side surfaces of track members 12, and thereby centre the carriage 16 over the table structure 13.

An arbor 35 extends transversely of the carriage and is supported for rotation in bearing housings 36 mounted on beams 19. Arbor 35 carries a plurality of circular saw blades 37 which are fixed to rotate therewith. The blades 37 are retained at predetermined spaced intervals by spacers 38 and have their lower tips projecting into troughs 15.

A V-belt pulley 39 at one end of arbor 35 is rotated by a motor 40 through belts 41. Motor 40 is mounted on the carriage between two channel members 17 and is carried by a base plate 42 which is supported at its ends by the upper edges of the channel side flanges 18 and between said channel members by front and rear vertically disposed webs 43 and 44 secured along their top edges to the under side of plate 42 and at their side edges to adjacent surfaces of the channel members. The forward edge of plate 42, which projects beyond the channel members 17 to overlie the adjacent track carrying member 8, is supported by stiffening webs 45 secured along their top and side edges to the adjacent surfaces of plate 42 and front web 43 respectively. The webs 45 at opposite ends also have overlapping portions secured in face-to-face relation with lapping portions of the adjacent channel side flanges 18.

The leading edge or front of the carriage supports a pair of vertical, laterally spaced, plates 47 which are suitably secured to the adjacent transverse channel member 17. These plates support a plurality of shafts 48 for rotation which are provided with reduction gears 49 from crank handles 50, carried by the ends of one shaft, to pinions 51, carried by the ends of another shaft. Each of the pinions engages a rack 52 extending longitudinally of track-carrying member 8. The carriage is moved along the tracks 12 by manipulation of cranks 50 which impart movement of pinions 51 along racks 52. As an alternative, suitable power drive may be substituted for the hand operated driving mechanism.

The apparatus is primarily designed for slitting and trimming long slabs of aluminum of a substantial thickness. As previously stated these slabs are heavy and awkward to manipulate for sliding movement to a stationary saw bench. Moreover, due to the irregularity of the side edges difficulty is encountered in keeping the slab properly aligned as it is fed to a stationary slitting saw. Accordingly, after moving the carriage 16 to one end of the table structure 13, a slab, indicated at 54 is placed on the table and secured thereto by clamping members 55. Clamp 55 comprises a spacer block 56 superimposed on the upper surface of a table I-beam 14 and a clamp arm 57 provided at one end with a bevelled projection 58 which rests on block 56 and is tiltable thereon. The other end of clamp arm 57 engages the upper surface of slab 54 which is supported on one flange of I-beam 15. A clamping bolt 59 extending through the flange of I-beam 14, block 56 and arm 57, exerts pressure on clamp arm 57 to retain the slab between the I-beam flange and said clamp arm.

When the motor is running the saw blades 37, which are preferably about 16 inches in diameter, should be rotating at a high rate of speed from about 6000 to 7000 R. P. M. With an aluminum slab of 1½" thickness it has been found that about 6700 R. P. M. is highly satisfactory for slitting a slab length of 40' at a rate of approximately 4 to 4½ minutes per slab length. When the rotation of the blades has reached its cutting speed, one man on each side of the machine advances the carriage at the desired rate of travel by manipulating cranks 50. When the slitting operation is completed the carriage is advanced sufficiently for removal of the slab strips.

Although I have shown and described the preferred embodiments of my invention it will be appreciated that additional changes and modifications may be resorted to without departing from the scope and spirit of my invention as defined by the appended claims.

What I claim is:

1. A plurality of longitudinally extending open top oil containing troughs, means for supporting a slab of aluminum in a stationary position directly overlying said troughs, stationary L-shaped supporting sections on either side of said troughs from which sections an inwardly directed track rail extends, a carriage, traction wheels mounted at opposite sides of said carriage and supported on said track rails to travel therealong for longitudinal movement of said carriage, and a saw arbour carrying rotating circular cutting blades above said slab with the lower edges of the blades projecting into said troughs.

2. Apparatus as set forth in claim 1 including means for imparting travelling movement to said carriage along said rails, said means comprising a rack member extending longitudinally of said rails, a pinion mounted on said carriage and engageable with said rack and a power mechanism mounted on said carriage for imparting rotary movement to said pinion.

3. A plurality of longitudinally extending open top oil containing troughs, means for supporting a slab of aluminum in a stationary position directly overlying said troughs, stationary L-shaped supporting sections on either side of said troughs, a track rail extending inwardly from the upper end of each of said supporting sections, a carriage mounted over said slab supporting means and movable in the longitudinal direction of the troughs, a saw arbour mounted on said carriage, rotating cutters supported on said arbour for rotation above said slab with the lower edges of the cutters projecting into the troughs, upper and lower traction wheels mounted at opposite sides of said carriage to rotate about horizontal axes, said upper wheels being disposed to travel along the upper surface of said track rails and said lower wheels being disposed to travel along the under surface of said rails, and edge roll traction wheels mounted at opposite sides of said carriage to rotate about vertical axes, said edge roll wheels being disposed to engage the inner side edges of said track rails.

4. Apparatus as set forth in claim 3, including means for eccentrically mounting each of said wheels for rotation about a second axis for adjustment of its first axis relative to said track rail.

References Cited in the file of this patent
UNITED STATES PATENTS

| | | |
|---|---|---|
| 846,259 | Swan et al. | Mar. 5, 1907 |
| 2,356,038 | Edwards | Aug. 15, 1944 |
| 2,356,872 | Monaco | Aug. 29, 1944 |
| 2,610,688 | Overman | Sept. 16, 1952 |